United States Patent [19]

Haugen

[11] 3,934,989
[45] Jan. 27, 1976

[54] GAS DRYING APPARATUS
[75] Inventor: Ronald L. Haugen, Pennington, N.J.
[73] Assignee: Ingersoll-Rand Company, Woodcliff Lake, N.J.
[22] Filed: July 17, 1974
[21] Appl. No.: 489,141

Related U.S. Application Data
[63] Continuation of Ser. No. 340,290, March 12, 1973, abandoned.

[52] U.S. Cl............................... 55/163; 55/189;387
[51] Int. Cl.².......................................... B01D 53/04
[58] Field of Search........... 55/21, 33, 58, 163, 189, 55/190, 387; 137/625.48

[56] References Cited
UNITED STATES PATENTS
3,696,588  10/1972  Dussaurd et al.................... 55/163
3,778,967  12/1973  Kauer, Jr. et al................. 55/163 X Primary Examiner—Charles N. Hart
Assistant Examiner—Robert H. Spitzer
Attorney, Agent, or Firm—Bernard J. Murphy

[57] ABSTRACT

The apparatus comprises a desiccant type drying chamber for drying compressed gas which is coupled to a novel ejector-valve device through which air is admitted for direct conduct through the chamber for gas drying purposes, or through which air is admitted for conduct through the chamber in a counter flow direction for regeneration of the desiccant, and the ejector-valve device serves the function of evacuating the chamber to effect desiccant regeneration.

11 Claims, 1 Drawing Figure

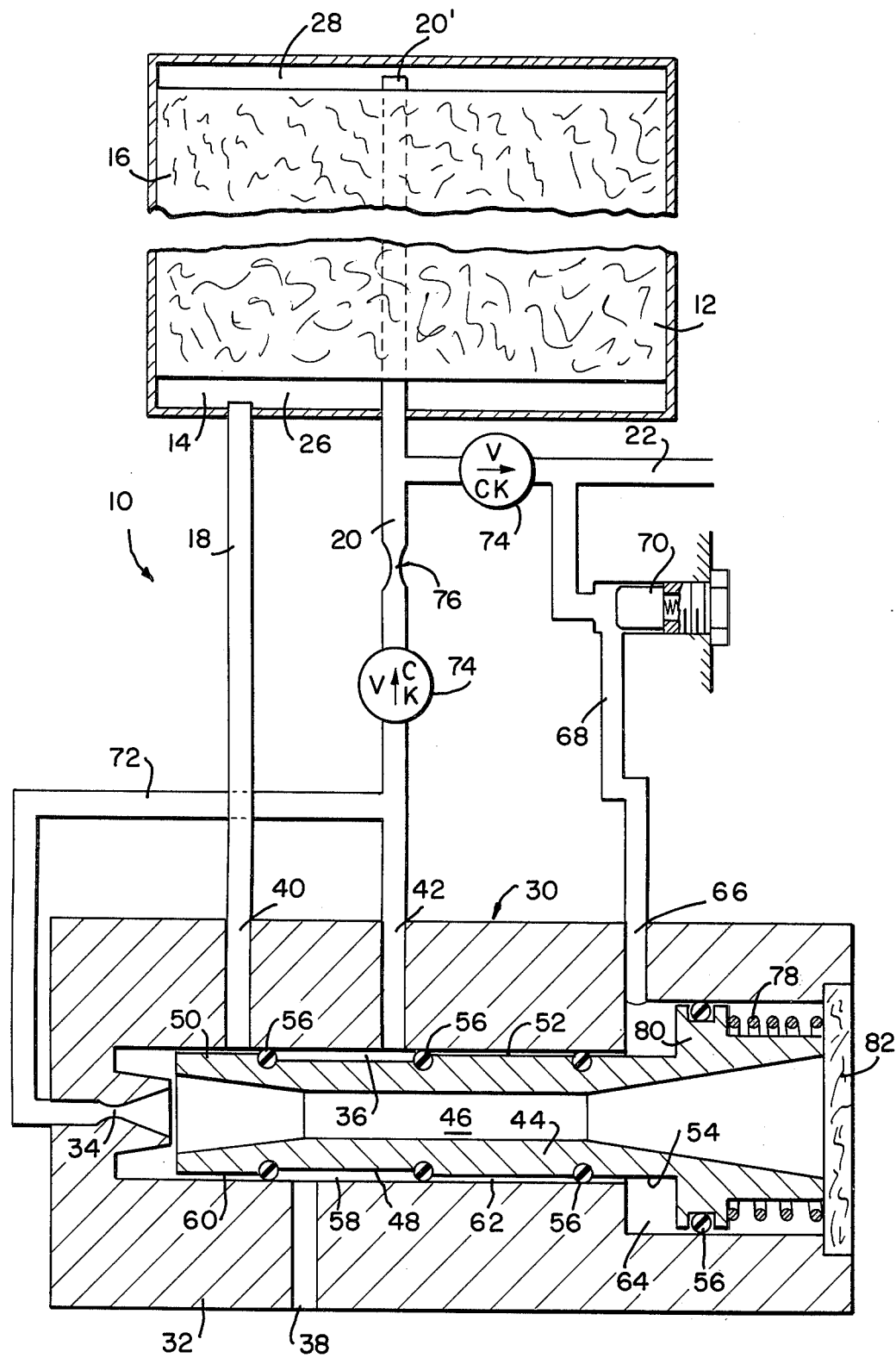

GAS DRYING APPARATUS

This is a continuation, of application Ser. No. 340,290 filed Mar. 12, 1973, now abandoned.

This invention pertains to gas drying apparatus, and in particular to such apparatus which uses a vacuum-producing device for evacuating a gas drying chamber which has a desiccant (or the equivalent). Such an apparatus is disclosed in U.S. Pat. No. 3,696,588, issued Oct. 10, 1972 for "Gas Drying Apparatus and Method" to the present applicant and co-inventor Jules L. Dussourd. In the patented invention, and in a disclosed embodiment, an ejector is taught for use in evacuating the desiccant chamber after a compressed gas receiver has been fully charged with a dried compressed gas product. In that patent, and in such prior art devices, it is required that a separate vacuum-producing device, and a separate four-way valve (or the equivalent) be employed with considerable piping and conduits to effect the use of the apparatus. The provisioning of separate ejector and valve components, and the use of a plurality of pipes and conduits, necessitate the boring of passageways through valve housings, and the use of a number of pipe Tees and couplers. Such system arrangements are therefore expensive and time consuming in manufacture. It is an object of this invention to set forth an apparatus of more simplified structure, in which the vacuum-producing device and the four-way valving element are combined in one structure. It is another object of this invention to teach gas drying apparatus which comprises a gas drying chamber; means for admitting gas to said chamber for drying said gas therewith; means for exiting dried gas from said chamber; and valving means, coupled to said admitting and exiting means, operative for controlling gas admittance and exiting; said valving means having a valve body and a valving element; and wherein said body and element cooperatively define a vacuum producing means which is operative, in response to the address of gas thereto, for producing a partial vacuum for evacuating said chamber.

It is another object of this invention to set forth an ejector, especially for use in gas drying apparatus, which comprises a gas nozzle; a gas diffusor element, having a elongate axis; and means defining a vacuum chamber communicating said nozzle and element; wherein said nozzle and element are relatively and axially moveable therebetween.

It is another object of this invention to set forth a fluid control valve, also for use in gas drying apparatus in particular, which comprises a body; said body having an elongate valve chamber formed therein; said body further having at least one inlet port formed therein which communicates with said valve chamber and at least two outlet ports formed therein which also communicate with said valve chamber; and a valving element movably disposed within said valve chamber, between first and second positions; said valving element having means for sealing off one of said two outlet ports from a valve chamber communication with the other of said outlet ports, and means for communicating said one inlet port with one of said outlet ports in said first position, and for communicating said one inlet port with the other of said outlet ports in said second position; and said body and said valving element have means for admitting fluid through said valve chamber along a pathway sealed off from said ports.

A feature of this invention comprises the use of an ejector-valve device with a valve body having a valving element therewithin which element is centrally bored, the element being slidably mounted within a valve body valve chamber. One end of the valve body has an aperture formed therethrough which defines a diffusor-type nozzle. In addition, the valving element has lands formed on the outer circumference thereof, and the lands are separated therebetween by wall members which sealingly engage an inner surface of the valve chamber in the valve body. With translation of the valving element, the lands accommodate a fluid flow communication between an inlet port and one or another of two outlet ports so that gas drying or dessicant regeneration might be accomplished. Further objects and features of the invention will become more apparent by reference to the following description, taken in conjunction with the accompanying figure.

The FIGURE is a schematic and cross-sectional view, in elevation, of a gas drying chamber throughconnected with an ejector-valve device, according to an embodiment of the invention.

As shown in the FIGURE, the gas drying apparatus 10 comprises a gas drying chamber 12 defined by a container 14 in which is confined desiccant 16. This desiccant 16 is loose, granular material, such as silica gel which is effective for drying gas.

A primary gas inlet conduit 18 is connected at one end for opening into the container 14, and a gas outlet conduit 20 is also connected to the container having a portion 20' which is passed through the desiccant 16 to open within an uppermost portion of the container. A gas delivery conduit 22 is throughconnected with conduit 20 intermediate the ends of the latter. Within container 14, and at the bottom thereof, is defined inlet plenum 26, so that gas admitted thereinto via conduit 18 may be diffused uniformly therewithin prior to its passage through the desiccant. Also an outlet plenum 28 is defined within the top of the chamber for similar purposes. Retainer screens (not shown) are used to hold the desiccant in spaced-apart relationship from the bottom and top of the container.

An ejector-valve device 30, shown in cross-section, comprises a body 32 which has an aperture formed in one end thereof which defines an ejector-type nozzle 34. The body also has a valve chamber 36 formed therewithin, with a gas inlet port 38 formed in one side of the body 32 which opens onto the valve chamber 36. At the other side of the body are two further ports, a primary gas outlet 40 and a secondary gas outlet 42. Ports 40 and 42 also communicate internally with the valve chamber 26 and externally of the valve body 32, and receive conduits 18 and 20. A valving element 44 having a bore 46 formed therethrough, the bore being configured to operate as a gas diffusor, is slidably carried in chamber 36. Valving element 44 has a plurality of lands 48, 50, 52, 54; these lands are annular and relieved surfaces which are spaced apart therebetween by walls. O-rings 56 define the land-separating walls, the rings 56, being of elastomeric material, are sealingly engaged with the inner surface of valve chamber 36. The inner surface of the valve chamber 36, the O-rings 56, and the several lands cooperately define first, second, third, and fourth annular compartments 58, 60, 62 and 64, respectively, within valve chamber 36. The second and fourth compartments, 60 and 64, are of variable volume. The fourth compartment 64 is made to be of variable volume in that it opens onto a pilot signal port 66 formed in the valve body 32 which port receives with a pilot signal conduit 68. Conduit 68 and port 66 cooperate to admit a compressed gas pilot signal into compartment 64 for moving valve element 44 axially within the valve chamber 36. Conduit 68 has a pressure sensing valve 70 interpositioned therewithin, valve 70 being responsive to a predetermined pressure to change from a normally closed to an open position. With the presence of such predetermined pressure in conduit 68, valving element 44 is moved to the right to assume the position shown in the FIGURE. A tap line conduit 72 opens onto conduit 20 and communicates with the nozzle 34. Check valves 74 are disposed in conduits 20 and 22 to admit gas flow therethrough only toward and away from container 14, respectively. A restrictive orifice 76 is interposed in conduit 20 so that, as is further explained herein only a minor portion of supplied gas will be admitted through line 20. A spring 78 is constrained against a wall annulus 80 of compartment 64 normally to urge element 44 to the left. Finally, a muffler 82 is supported in the open end of valve chamber 26 which is opposite nozzle 34.

In a first mode of operation, compressed gas supplied from a gas compressor, or the like, is addressed to port 38 for communication with compartment 58 and, in the absence of a pilot signal at port 66, finds element 44 spring biased to a left-hand position in chamber 36. Accordingly, the gas is communicated from compartment 58 through port 40 to the container 14 for drying thereof by the desiccant 16. Thereafter, the dried, compressed gas is passed through conduits 20' and 20, to the delivery conduit 22 for supply to storage or for use in an end item.

When the supply storage receiver, or whatever, is fully charged, or when a using end item halts compressed gas operation, this will define a back pressure in line 22 and an upper portion of line 68. Accordingly, the pressure-sensing control valve 70 yields before this sensed pressure to open conduit 68 to the flow of the signal fluid. The input signal fluid bears against annulus 80 and valving element 44 is translated to the right (into the position shown in the FIGURE). The compressed gas input is maintained at port 38 and compartment 58, but now compartment 58 opens onto port 42. Port 40 is sealed off from compartment 58. The input supply is admitted to conduit 20, but some greater percent of the supply is passed along conduit 72 for address thereof to the nozzle 34; this causes ejector operation of the nozzle 34 and diffusor-configured bore 46. The remaining lesser percent of the supplied gas is restrictively passed further along conduit 20, through orifice 76 and therefrom into outlet plenum 28. An ejector-operation induced vacuum at port 40, and in compartment 60 causes the lesser percent of gas to move in countercurrent flow through the desiccant 16, to effect its regeneration, and therefrom into conduit 18, port 40 and compartment 60 for entrainment with the nozzle-discharged greater percent of gas, and discharge via muffler 82.

The present disclosure teaches an apparatus of simple, compact and efficient structure which more readily can practice the invention disclosed in U.S. Pat. No. 3,696,588 A singlarly novel feature of the present disclosure is the employment of the inventive ejector-valve device 30 which can be used in the overall gas drying apparatus 10. More, however, this device 30 teaches a novelty, for the first time, which comprises that which is a valve incorporating a diffusor function and/or a diffusor incorporating a valving function. While particular uses are made of device 30, in connection with this disclosure, to wit: to facilitate both gas drying and desiccant regeneration, other uses will suggest themselves to those skilled in the arts of gas drying, desiccant regeneration, valving, and ejector structuring, for instance, from the teachings given herein. Therefore, while I have described my invention in connection with a specific embodiment thereof, it is to be clearly understood that this is done only by way of example, and not as a limitation to the scope of my invention as set forth in the objects thereof and in the appended claims.

I claim:

1. Gas drying apparatus, comprising:

a gas drying chamber;

conduit means for admitting gas to said chamber for drying gas therewithin, and for exiting dried gas from said chamber; and valving means, coupled to said conduit means, pneumatically operative for controlling gas admittance and exiting; wherein said valving means comprises a valve body having a valve chamber formed therewithin and a valving element pneumatically movably disposed within said valve chamber;

said valving means and said conduit means comprise first means for communicating said drying chamber with said valve chamber for causing gas to be admitted to said drying chamber via said valve chamber; and wherein said valving means further comprises pilot signal means operative for addressing gas to said valving element pneumatically to effect movement of said valving element, means coupled to said latter means and to said conduit means, responsive to a predetermined gas pressure subsisting in said conduit means, for operating said latter means, second means, joined to said conduit means, for communicating said drying chamber with said valve chamber for causing gas to be admitted to said drying chamber via said valve chamber, and means operative in response to movement of said valving element, and cooperative with said second means and said conduit means, for producing a partial vacuum, for applying the vacuum to said drying chamber, and for evacuating said chamber.

2. Apparatus, according to claim 1, wherein:

said valving element comprises a gas diffusor.

3. Gas drying apparatus, according to claim 1, wherein:

said valving element comprises an elongate member having an axially extending bore formed therethrough, said bore defining an ejector-type gas diffusor.

4. Gas drying apparatus, according to claim 3, wherein:

said body has a port formed therein which defines an ejector type gas nozzle;

said nozzle opens at one end thereof on an outer surface of said body, and at the opposite end thereof onto an end of said valve chamber; and wherein said valving element is disposed in said valve chamber with an inlet end of said diffusor in adjacency to said opposite end of said nozzle.

5. Apparatus, according to claim 4, wherein:

said valving element is slidably disposed in said valve chamber, for movement between first and second positionings relative to said valve chamber, and has means for effecting gas sealing engagement of outer surfacing thereof with valve chamber surfacing.

6. Apparatus, according to claim 5, wherein:

said valving element has a plurality of relieved, annular lands formed thereon, and said gas sealing means comprises annular walls interpositioned between said lands;

said walls, lands, and valve chamber surfacing cooperatively define a plurality of separate compartments about said valving element; and said body further has a gas inlet port formed therein, which opens on one of said compartments, and a primary gas outlet port which also opens on said one compartment when said element is in one of said first and second positionings and which opens on a second of said compartments when said element is in another of said positionings.

7. Apparatus, according to claim 6, wherein:

said valving means further has resilient means for normally urging said valving element to said one positioning, to open a gas flow communication between said gas inlet and outlet ports via said one compartment.

8. Apparatus, according to claim 7, wherein:

said body further has a secondary gas outlet port also formed therein which also opens on said one compartment when said valving element is in said second positioning, and which opens on a third of said compartments when said valving element is in said first positioning.

9. Apparatus, according to claim 8, wherein:

said body further has a pilot signal port also formed therein which opens on a fourth of said compartments, the latter being a variable-volume compartment which is closed on one side thereof by a wall annulus, said resilient means comprises a spring constrained against said wall annulus to normally constrict the volume of said fourth compartment.

10. Apparatus, according to claim 9, wherein:

said pilot signal means includes a pilot signal conduit in communication with said fourth compartment for addressing a pilot-signalling component of gas to said wall annulus for moving said wall annulus to dispose said valving member in said second positioning.

11. Apparatus, according to claim 10, further including:

an element interpositioned within said pilot signal conduit normally operative to close off said pilot signal conduit and responsive to said predetermined pressure in said pilot signal conduit to open the latter.

* * * * *